United States Patent [19]

Carnahan

[11] Patent Number: 5,444,112
[45] Date of Patent: Aug. 22, 1995

[54] SPRAYABLE NONIONIC NEOPRENE LATEX ADHESIVE AND METHOD OF PREPARATION

[75] Inventor: David W. Carnahan, White, Ga.

[73] Assignee: CJ's Distributing, Inc., Cartersville, Ga.

[21] Appl. No.: 243,468

[22] Filed: May 16, 1994

[51] Int. Cl.⁶ .......................... C08J 3/26; C08L 11/02
[52] U.S. Cl. .................... 524/272; 524/270; 524/432; 524/552
[58] Field of Search ............... 524/270, 432, 552, 272

[56] References Cited

U.S. PATENT DOCUMENTS

| | | | |
|---|---|---|---|
| 4,130,528 | 12/1978 | Chen | 524/519 |
| 4,485,200 | 11/1984 | Perlinski et al. | 525/113 |
| 4,890,444 | 1/1990 | Vander Giessen et al. | 55/498 |
| 5,332,771 | 7/1994 | Christell | 524/270 |

Primary Examiner—Paul R. Michl
Assistant Examiner—Olga Asinovsky
Attorney, Agent, or Firm—Joseph H. Beumer

[57] ABSTRACT

A sprayable adhesive based on nonionic neoprene latex includes in the adhesive mixture a nonionic surfactant, along with the latex, which is a copolymer of chloroprene and methacrylic acid stabilized with polyvinyl alcohol. The adhesive also includes a tackifier, zinc oxide, and an antioxidant. The tackifier is a petroleum-derived hydrocarbon resin, and the antioxidant is a hindered bis-phenol. In order to obtain a rapid drying adhesive, only the latex and surfactant are mixed as liquids. The remaining ingredients are added in solid form and dispersed by mixing under high shear. The adhesive can be applied by spraying from a canister using dimethyl ether as a propellant.

19 Claims, No Drawings

SPRAYABLE NONIONIC NEOPRENE LATEX ADHESIVE AND METHOD OF PREPARATION

FIELD OF THE INVENTION

This invention relates to neoprene latex adhesives.

BACKGROUND OF THE INVENTION

Neoprene has been widely used as a base for adhesives in formulations intended to take advantage of its outstanding characteristics, in particular, its high bond strength, flexibility, and resistance to attack by oils, chemicals, water, heat, sunlight, and ozone. Most of the prior neoprene adhesive formulations have used an organic solvent medium. Owing to concerns regarding the toxicity and flammability of solvents as well as their adverse effects on the environment, emphasis has now shifted toward development of water-based neoprene latex adhesives.

Numerous formulations of neoprene latex adhesives have become available as described in a DuPont bulletin entitled "Neoprene Latex-based Adhesives" by D. G. Cole (printed October 1991). All of the neoprene latexes described in this publication are anionic in character, except for DuPont Latex 115, which is nonionic. Latex 115 is a copolymer of chloroprene and methacrylic acid, dispersed and stabilized with polyvinyl alcohol. The presence of carboxyl groups in the polymer of this material gives it a high reactivity for undergoing cross-linking reactions with bivalent metal oxides at room temperature. This provides important advantages such as improved hot bond strength as compared to anionic latexes. Superior mechanical and chemical stability are also distinguishing features of Latex 115. As pointed out in the referenced bulletin, Latex 115 behaves in a totally different manner from anionic latexes; thus measures which are required or useful in compounding for Latex 115 differ substantially from those for other types of neoprene latexes.

The product bulletin gives various directions and suggestions for compounding of adhesive formulations based on Latex 115. No disclosure is given, however, regarding preparation of a Latex 115 formulation that would be amenable to application by aerosol spraying. An aerosol-sprayable nonionic latex adhesive is desired to enable easier application and to obtain a higher yield in terms of coverage per unit amount of latex. Spraying of adhesive formulations based on Latex 115 has presented difficulty owing to the tendency of this material to undergo agglomeration and coagulation, resulting in rapid plugging of spray orifices.

Another DuPont bulletin entitled "Contact Adhesives Based on Carboxylated Neoprene Latex 115" by D. G. Cole and J. W. McDonald discloses various contact adhesive formulations using this form of neoprene and methods of preparing the formulations. This reference, however, is not concerned with sprayable adhesives, and use of an alkali reagent such as sodium hydroxide is recommended to enable larger amounts of zinc oxide to be included. The presence of alkali is also said to enable preparation of the adhesive by a "one-shot high-shear mixing" technique. Avoidance of the use of a caustic alkali would be desirable owing to the hazardous nature of such materials. This reference further teaches use of coalescence aids and thickeners not appropriate for a sprayable material. No disclosure is given regarding surfactants.

One of the most important features of sprayable water-based adhesives is the drying time of the sprayed-on adhesive. A minimized time is desirable, particularly for manufacturing applications where prolonged drying time would increase costs by slowing up production. It is therefore desirable to use a formulation method which provides for effective mixing and sprayability, while requiring a minimum amount of water.

Measures taken to enhance sprayability of water-based latex paints and adhesives are disclosed in various prior patents. U.S. Pat. No. 4,384,661, issued on May 24, 1983, to Page et al., discloses use of a nonionic surfactant having a high HLB value to avoid foaming in latex paint polymer systems. Aerosolsprayable latex paints using polymer mixtures or alcohol additives are disclosed in U.S. Pat. No. 4,420,575, issued on Dec. 13, 1983, to Rapaport et al., and U.S. Pat. No. 4,265,797, issued on May 5, 1981, to Suk. U.S. Pat. No. 4,477,613, issued on Oct. 16, 1984, to Evans et al., discloses stabilization of an aqueous-based tackifier by providing a minor amount of a nonionic or anionic surfactant and a minor amount of an elastomeric latex. U.S. Pat. No. 4,004,049, issued on Jan. 18, 1977, to Horwat et al., discloses a sprayable latex adhesive provided with a controlled degree of instability to obtain improved adhesion. None of these patents discloses an aerosol-sprayable water-based adhesive based on a nonionic neoprene latex polymer.

SUMMARY OF THE INVENTION

The present invention is directed to a sprayable adhesive composition based on nonionic neoprene latex and to a method of preparing the composition. Sprayability, including the capability for application by aerosol spraying, is imparted in the adhesive by providing a nonionic surfactant in the composition and by avoiding ingredients which would cause coalescence or thickening. The addition of a nonionic surfactant provides for an effective adhesive formulation without use of an alkali and enables preparation of the formulation using a modified "one-shot high-shear mix" technique, resulting in a sprayable composition with minimized water content. This gives an important advantage in reducing required drying time.

Compositions embodying the invention may comprise, on a dry weight basis, 100 parts of a nonionic neoprene latex, in particular DuPont 115, 10 to 50 parts of a tackifier, 1 to 10 parts of zinc oxide, 1 to 3 parts of an antioxidant, and 0.5 to 3 parts of a nonionic surfactant. In a preferred procedure, the composition is prepared by combining a nonionic neoprene latex emulsion with the nonionic surfactant, adding the remaining ingredients in dry form and mixing at high speed. The mixture is then filtered. For aerosol spray applications, the composition may be placed in a pressurized canister or can along with a suitable propellant such as dimethyl ether.

It is therefore an object of this invention to provide a sprayable adhesive composition based on a nonionic neoprene latex.

Another object is to provide a method of preparing such compositions in a form suitable for application by spraying.

Still another object is to provide an aerosol sprayable adhesive composition based on a nonionic neoprene latex.

Yet another object is to provide a sprayable water-based latex adhesive characterized by a minimum drying time.

Other objects and advantages of the invention will be apparent from the following detailed description.

DETAILED DESCRIPTION OF THE INVENTION

The nonionic neoprene latex which forms the base for adhesives embodying the invention comprises a copolymer of chloroprene and methacrylic acid, dispersed and stabilized with polyvinyl alcohol in an aqueous medium, adjusted to neutral pH. This material is available commercially under the designation DuPont Latex 115 in the form of an aqueous dispersion having a water content of 47 percent. Any other available nonionic neoprene latex may also be used.

A tackifier is required in the neoprene latex adhesive to provide effective adhesion and enhanced tack. Various types of known tackifiers can be used in the composition of the present invention, including rosin acids derived from wood or tall oil, hydrocarbon resins derived from petroleum, and synthetic resins such as styrene-butadiene. Examples of commercially available materials which are effective for this purpose include the following: Piccovar ® K25, an alkylaryl hydrocarbon derived from petroleum and available from Hercules, Inc., Resins Group; Tacolyn ® 1085, a petroleum-derived hydrocarbon also available from Hercules, Inc.; Picco ® 6000, an aromatic hydrocarbon resin produced from petroleum derived molymers and available from Hercules, Inc.; Butofan ® NS 222, a carboxylated styrene-butadiene copolymer available from BASF Corporation; Zonester, a rosin-based resin available from Arizona Chemical; and Nirez 2019, a terpene phenolic resin, also available from Arizona Chemical. Although aqueous dispersions of a tackifier may also be used, it is preferred to add the tackifier as a solid in the form of dry flakes or the like and to incorporate the solid directly into the latex dispersion under rapid agitation. This keeps the water content to a minimum and provides for shorter drying times. Ten to fifty parts of tackifier on a dry weight basis per hundred parts of the neoprene latex may be used, and 40 parts is preferred. Mixtures of the tackifiers listed above may also be used.

Zinc oxide is included in the adhesive to react with carbonyl groups in the neoprene latex and thereby to improve bond strength, heat resistance, and long-term aging of the glue line. From 1 to 10 parts zinc oxide per 100 parts of latex may be used, and about 3 parts is preferred. I have found that the preferred amount may be readily incorporated in an adhesive without first dispersing the zinc oxide in a caustic material such as sodium hydroxide as is indicated in the literature to be necessary.

An antioxidant is provided in the adhesive in an amount of 1 to 3 parts per 100 parts of latex for the purpose of improving stability and retarding oxidation reactions. Such reactions result in release of small quantities of hydrogen chloride, which can attack materials such as cellulosics and metals, resulting in corrosion or embrittlement. The antioxidant works in combination with zinc oxide, which in turn acts as an acid acceptor as well as promoting cross-linking. The antioxidant preferably comprises a hindered bis-phenol, such a material being available under the designation Wingstay-L available from Goodyear.

A nonionic surfactant is essential to providing a composition which may be applied by aerosol spraying without coagulating or clogging the spray equipment or canister. The surfactant may comprise nonylphenol as the starting hydrophobic material and ethylene oxide as the hydrophilic substance. In particular, a preferred surfactant available commercially from Rhone Poulenc under the designation IGEPAL® CO-660 has a mole ratio of ethylene oxide to nonylphenol of 10:1. Other surfactants of this type having different mole ratios and nonionic surfactants having a different chemical composition may also be used. The preferred surfactant is in the form of a viscous liquid which mixes readily with a latex dispersion in forming the sprayable adhesive products.

A small amount, for example, 0.01 percent, of an antimicrobial agent such as a mixture of 1.15 to 1.25 percent 5-chloro-2-methyl-4-isothiazolin-3-one, 0.35 to 0.45 percent 2-methyl-4-isothiazolin-3-one, 1 to 1.2 percent magnesium chloride, 1.7 to 1.8 percent magnesium nitrate, 0.15 to.0.17 percent copper nitrate trihydrate and water available commercially from Rohm and Haas Company under the designation KATHON LX may also be included in the adhesive to prevent damage due to bacteria and the like.

Some components which have normally been used in other latex adhesive mixtures, in particular coalescent aids and thickeners, are to be avoided in the present invention so as to minimize the possibility of clogging.

The components described above are combined under agitation to form a dispersion which is then filtered to remove particles which could cause coagulation and clogging up of spray equipment or containers. In order to obtain a sprayable composition that exhibits a minimum drying time, use of the following sequence of steps is preferred. The starting nonionic neoprene latex, in the form of a dispersion having a water content of 47 percent, is first combined with a liquid surfactant, and the two are thoroughly mixed. The remaining ingredients including the resin, zinc oxide, and the antioxidant are then added to the dispersion in dry form under high shear as by being agitated in a Silverson mixer at a speed of 3,445 rpm. An essentially complete dispersion is normally obtained within 90 minutes. This procedure results in a sprayable product with a much shorter drying time of some five to ten minutes as compared to three times longer required where other methods of forming the mixture as by combining dispersions of more than one component under low shear conditions. The dispersion is then subjected to filtration to remove any coagulated solids that might cause clogging. Passage through a diaphragm filter having a polypropylene fiber element with −100 micron pores is suitable for this purpose.

Depending on the amount of adhesive being used for a particular type of application, the adhesive prepared as described above may be packaged in self-contained, pressurized aerosol cans or canisters or in drums equipped with a pressurized air system and a remote spray gun.

When more than one pound of material is to be sprayed out, the preferred approach is to employ a canister system. Canisters for this purpose may comprise a generally cylindrical pressurized container, a dip tube extending down into the container, a valved outlet, a hose attached to the outlet, and a spray gun at the outer end of the hose. In order to avoid coagulation and clogging of orifices, to which adhesives are inherently susceptible, it is preferred to use hoses and valves having relatively large orifices such as ⅛ to ¼ inch. Hose lengths should not exceed 18 feet for the same reason. A canister system which may be used comprises a disposable cylinder canister Model No. DOT39NRC available from Amtrol, Inc.,; hoses made of teflon braiding, steel braiding, and Hydel covered brass fitting available from Teleflex Fluid Systems under the designation Teleflex P/N T1167-04, and a spray gun, Model No. 30L available from Spraying Systems Company. After loading the canister with the adhesive, air is evacuated, and dimethyl ethyl ether is introduced through the orifice valve to provide an aerosol propellant. The dimethyl ether is provided in an amount of 10 to 30 parts compared to the weight of the adhesive. Larger amounts of dimethyl ether result in a reaction between the propellant and the surfactant, producing clogging. The pressure of dimethyl ether in the canister at the preferred concentration is within the range of 60 to 65 psi at typical working temperatures from 70° F. to 90° F.

EXAMPLES

EXAMPLE 1

To 3.25 pounds of Neoprene Latex 115 was added 45.4 grams of IGEPAL ® C0660 nonyphenol-ethylene oxide surfactant. To this mixture was added 1.75 pounds of Tacolyn ® 1085, a petroleum-derived tackifier. The mixture was stirred with low shear. After mixing for 30 minutes, 45.4 grams of zinc oxide and 2.27 grams of KATHON LX were added. Eighty grams of the resulting mixture was placed in an aerosol can, which was charged with 20 grams of dimethyl ether. The mixture sprayed readily out of the 25 aerosol can.

EXAMPLE 2

Example 1 was repeated except that the surfactant was omitted from the mixture. The mixture coagulated and could not be sprayed.

EXAMPLE 3

The following ingredients were blended together under low shear conditions: 4.88 pounds Latex 115, 1.60 pounds Butofan® 222 tackifier, 0.88 pounds Piccovar® K55 tackifier, 2.66 pounds Tacolyn® 1085 tackifier, 220 grams C-560 (a mixture of 10 parts zinc oxide and 40 parts of an Agerite stalite antioxidant), 4.5 grams of KATHON LX antimicrobial agent, and 90.8 grams of C0660 surfactant. The mixture was placed in an aerosol can, which was then charged with dimethyl ether at a proportion of 30 parts by weight per 70 parts of the mixture. The mixture readily sprayed out of the can.

EXAMPLE 4

Example 3 was repeated except that 60 parts of the adhesive mixture and 40 parts of dimethyl ether were used. The mixture coagulated and could not be sprayed.

I claim:

1. A sprayable adhesive composition comprising:
an aqueous dispersion of the following components on a dry weight basis:
a nonionic neoprene latex consisting of a copolymer of chloroprene and methacrylic acid dispersed and stabilized with polyvinyl alcohol - 100 parts;
a tackifier - 10 to 50 parts;
zinc oxide unreacted with a caustic material - 1 to 10 parts;
an antioxidant - 1 to 3 parts; and
a nonionic surfactant - 0.5 to 3 parts; and
said composition being free of coalescence aids and thickeners.

2. The composition as defined in claim 1 wherein said aqueous dispersion has a water content of 47 to 65 percent.

3. The composition as defined in claim 2 wherein said nonionic surfactant comprises a reaction product of nonylphenol and ethylene oxide.

4. The composition as defined in claim 3 wherein said antioxidant comprises a hindered bis-phenol.

5. The composition as defined in claim 4 wherein said tackifier comprises a hydrocarbon resin derived from petroleum.

6. The composition as defined in claim 1 including an antimicrobial agent.

7. The composition as defined in claim 6 wherein said agent is a mixture of 5-chloro-2-methyl-4-isothiazolin-3-one, 2-methyl-4-isothiazolin-3-one, magnesium chloride, magnesium nitrate, copper nitrate trihydrate, and water.

8. An aerosol sprayable mixture adapted to be disposed in a pressurized aerosol spray canister comprising:
a nonionic neoprene latex consisting of a copolymer of chloroprene and methacrylic acid dispersed and stabilized with polyvinyl alcohol - 100 parts;
a tackifier - 10 to 50 parts;
zinc oxide unreacted with a caustic material - 1 to 10 parts;
an antioxidant—1 to 3 parts;
a nonionic surfactant - 0.5 to 3 parts; and
an effective amount of dimethyl ether propellant;
said composition being free of coalescence aids and thickeners.

9. The sprayable mixture as defined in claim 8 wherein said dimethyl ether is provided at a weight proportion of 10 to 30 percent compared to said dispersion.

10. The sprayable mixture as defined in claim 8 including an antimicrobial agent.

11. The method of preparing a sprayable nonionic neoprene latex adhesive characterized by rapid drying capability which comprises:
mixing an aqueous dispersion of a nonionic neoprene latex having a water content not exceeding about 55 percent with a liquid nonionic surfactant at a proportion of 1 to 3 parts of said surfactant per 100 parts of said latex on a dry weight basis;
adding to the resulting mixture in dry solid form a tackifier at a proportion of 10 to 50 parts, zinc oxide at a proportion of 1 to 10 parts, an antioxidant at a proportion of 1 to 3 parts, all with respect to 100 parts of said latex; and
mixing the combined liquid dispersion and solids under high shear conditions until the solids are fully dispersed therein.

12. The method as defined in claim 11 wherein said nonionic latex comprises a copolymer of chloroprene and methacrylic acid, dispersed and stabilized with polyvinyl alcohol.

13. The method as defined in claim 12 wherein said tackifier comprises a petroleum-derived hydrocarbon.

14. The method as defined in claim 12 wherein said high shear conditions comprising mixing at a mixing blade speed of 3,400 to 3,500 rpm.

15. The method as defined in claim 13 wherein said antioxidant comprises a hindered bis-phenol.

16. The method as defined in claim 14 including the step of filtering the combined liquid dispersion.

17. The aerosol sprayable mixture as defined in claim 8 wherein said mixture is free of adhesive polymers other than said latex and said tackifier.

18. An aerosol sprayable mixture adapted to be disposed in an aerosol spray canister consisting of:

a nonionic neoprene latex consisting of a copolymer of chloroprene and methacrylic acid in an aqueous dispersion and stabilized with polyvinyl alcohol - 100 parts, on a day weight basis;
a tackifier - 10 to 50 parts;
zinc oxide - 1 to 10 parts;
an antioxidant - 1 to 3 parts;
a nonionic surfactant - 0.5 to 3 parts;
a small amount of an antimicrobial agent; and an effective amount of dimethyl ether propellant.

19. The aerosol sprayable mixture as defined in claim 18 wherein said dimethyl ether is provided at a weight proportion of 10 to 30 percent of said dispersion.

* * * * *